T. G. HERBERT.
POTATO DIGGER.
APPLICATION FILED JULY 30, 1910.

994,513.

Patented June 6, 1911.

Witnesses

Inventor
Thomas Geo. Herbert

UNITED STATES PATENT OFFICE.

THOMAS GEORGE HERBERT, OF OTTAWA, ONTARIO, CANADA.

POTATO-DIGGER.

994,513.                        Specification of Letters Patent.        Patented June 6, 1911.

Application filed July 30, 1910. Serial No. 574,694.

*To all whom it may concern:*

Be it known that I, THOMAS GEORGE HERBERT, of 217 Kent street, city of Ottawa, in the Province of Ontario, in the county of Carleton, in the Dominion of Canada, having invented certain new and useful Improvements in Potato-Diggers, do hereby declare that the following is a full, clear, and exact description of the same.

The invention relates to improvements in potato diggers as described in the present specification and illustrated in the accompanying drawings that form part of the same.

The invention consists essentially in the novel construction and arrangement of parts whereby the potatoes are dug up by a suitable digger in the fore part of the machine and transported to the rear thereby, and therefrom laterally transported to an endless carrier adapted to dump them in a suitable receptacle.

The objects of the invention are to facilitate the harvesting of a potato crop, to decrease the number of hands usual to such operations and generally to provide a simple, cheap and durable machine.

Figure 1:
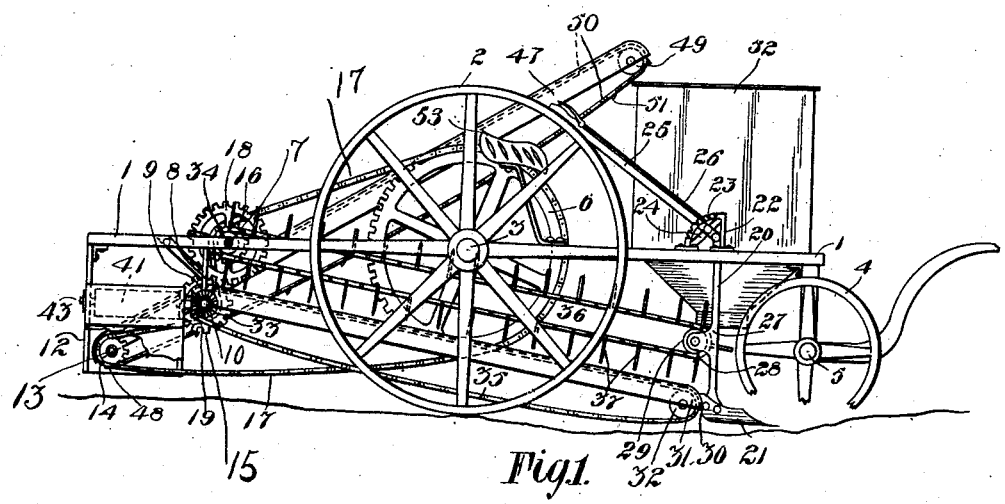
Figure 2:
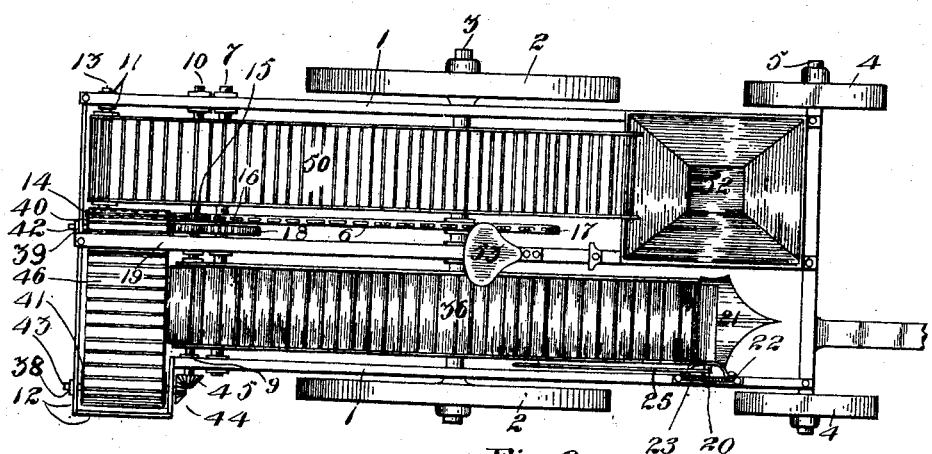

In the drawings, Figure 1 is a side elevation of the machine. Fig. 2 is a plan view of the arrangement of the carriers, running gear and receptacle.

Like numerals of reference indicate corresponding parts in each figure.

Referring to the drawings, 1 is the frame of the machine.

2 are the main wheels of the machine mounted on the rotating axle 3.

4 are the front wheels of the running gear mounted on the axle 5.

6 is the main sprocket wheel mounted on the axle 3 and rotating therewith.

7 is a shaft journaled in suitable bearings in the sides of the frame 1, to the rear of the main axle 3.

8 are brackets depending from the frame 1, slightly to the rear of the shaft 7 and forming the bearings 9, at the rear ends thereof.

10 is a shaft journaled in the bearings 9.

11 are bearings suitably supported adjacent to the ground level from the rear part 12 of the frame.

13 is a shaft journaled in the bearings 11.

14 is a sprocket wheel fixedly mounted on the shaft 13.

15 is a sprocket wheel loosely mounted on the shaft 10.

16 is a sprocket wheel fixedly mounted on the shaft 7.

17 is an endless chain extending around the main sprocket wheel 6, and therefrom around the sprocket wheel 16, the sprocket wheel 15 and the sprocket wheel 14, and thus operatively connecting the main axle 3 with the shafts 7 and 13.

18 is a gear wheel fixedly mounted on the shaft 7.

19 is a pinion fixedly mounted on the shaft 10 and co-acting with the gear wheel 18, thus operatively connecting the shafts 7 and 10.

20 is an arm vertically arranged and slidingly held to one side of the frame 1.

21 is a digger carried on the lower end of the arm 20 and rigid therewith.

22 is a bracket rigidly secured to the frame 1 on the upper side thereof and having a tooth quadrant 23 forming a part thereof and the bar 24 extending thereacross.

25 is a lever carrying the spring-held pawl operated from the rod and handle 26. The lever 25 is pivotally secured adjacent to the end thereof to the bar 24, and at its extremity it is pivotally secured to the top of the arm 20. It will be thus seen that the digger 21 may be raised or lowered by operating the lever 25 on the quadrant 23, as the spring-held tooth carried by said lever engages the teeth of said quadrant.

27 is an extension rearwardly from the arm 20 intermediate of the height of said arm, the said extension 27 carrying the bearings 28.

29 is a roll journaled on the bearings 28.

30 is an extension rearwardly from the lower end of the arm 20 carrying the bearings 31.

32 is a roll journaled on the bearings 31.

33 is a roll fixedly mounted on the shaft 10.

34 is a roll fixedly mounted on the shaft 7.

35 is an endless carrier extending around the rolls 32 and 33 and adapted to carry the potatoes gathered by the digger 21.

36 is an endless belt extending around the rollers 29 and 34 and carrying fingers 37 for retaining the potatoes on the endless carrier 35 during its travel.

38 are bearings supported from the frame 1 and the rear part of the frame 12, beyond one of the main sides of the said frame 1. 39 are bearings supported from the said frame 1 and the rear part of the frame 12 toward the center between the sides of the frame 1, said bearings 38 and 39 being longitudinal in relation to the machine.

41 and 40 are rolls fixedly mounted on shafts 43 and 42, said shafts being journaled in the bearings 38 and 39 respectively.

44 is a bevel pinion mounted on the inner end of the shaft 43.

45 is a bevel pinion mounted on the outer end of the shaft 10 and co-acting with the bevel pinion 44, consequently the co-incident operation of the endless carrier 46 which extends around the rolls 40 and 41.

It will now be seen that the endless carrier 46 operates laterally, while the endless carrier 35 operates longitudinally, therefore the potatoes transported along the endless carrier 35 will be transported to the lateral direction on reaching the endless carrier 46, which is at the rear end of the said endless carrier 35.

47 is a frame extending obliquely from the rear portion 12 of the frame in an upward direction on the other side of the machine to the carrier 35.

48 is a roll fixedly mounted on shaft 13.

49 is a roll journaled at the upper end of the frame 47.

50 is an endless carrier extending around the rolls 48 and 49 and having slats or teeth 51 extending outwardly therefrom to engage the potatoes carried upward on said carrier.

52 is a receptacle toward the front of the machine supported on the frame and the running gear and adapted to receive the potatoes delivered from the carrier 50.

53 is a seat for the driver suitably arranged and convenient to the operating lever 25.

In the operation the machine is drawn by horses or propelled in any suitable manner, and the driver, as soon as he reaches the row of potatoes to be dug, lowers the digger 21. This digger scoops the potatoes from the soil and carries them on to the carrier 35. The potatoes on said carrier are engaged by the fingers 37, and as the said carrier 35 is traveling continuously with the rotation of the shaft 10, the said potatoes are transported onto the lateral carrier 46. This carrier 46 is operating co-incidently with the rotation of the shaft 10 through the bevel gear connection therebetween, therefore the potatoes slide across the machine to the elevator, or endless carrier 50. The elevating carrier 50 transports the potatoes upwardly and into the receptacle 52.

What I claim as my invention is:

1. In a device of the class described, in combination, a frame, a plurality of longitudinal and transverse bearings supported from said frame, a running gear having a main rotating axle, a main sprocket wheel mounted on said axle, a roller shaft journaled in lateral bearings toward the rear end of the machine and below the main frame, a shaft journaled in lateral bearings above said roller shaft, a sprocket wheel on said lower shaft, a chain connecting said sprocket wheels, an arm vertically adjustable toward the front end of said frame, a digger carried by said arm at its lower end, bearings supported from said arm at the lower end thereof and intermediate of its height, rollers journaled in said bearings supported from said arm, rollers fixedly mounted on said shafts toward the rear of the machine, an endless carrier extending around the lower set of rollers and adapted to transport potatoes from said digger, an endless belt extending around the upper set of rolls, with fingers adapted to engage the potatoes on said endless carrier, a laterally arranged endless carrier having its rolls journaled in longitudinally arranged bearings, a receptacle for the potatoes and an endless carrier suitably supported and adapted to transport the potatoes from the delivery end of said lateral carrier to said receptacle.

2. In a device of the class described, in combination, a frame, a running gear supporting said frame having a main rotating axle, a main sprocket wheel fixedly mounted on said axle, a plurality of bearings supported by said frame, a digger, a vertical arm adjustably arranged and supported toward the front end of said frame and carrying said digger at the lower end thereof, a toothed quadrant supported on said frame, a lever pivotally secured to said quadrant and connected with said arm, a spring-held pawl secured to said lever and engaging said quadrant, an endless belt carrier extending at an upward incline from the lower end of said vertical arm toward the rear end of the machine, a driven shaft suitably journaled and having the rear roll of said endless carrier fixedly mounted thereon, a bevel pinion fixedly mounted on the end of said driven shaft, a pinion mounted on the other end of said driven shaft, an endless belt carrier at the rear end of said machine laterally arranged and adapted to receive the potatoes from the aforesaid endless carrier, a driven shaft journaled in bearings at right angles to the aforesaid driven shaft and having one roll of said laterally arranged carrier fixedly mounted thereon, a bevel pinion fixedly mounted on said lateral carrier shaft co-acting with the aforesaid bevel pinion, an endless belt having projections outwardly therefrom and supported at its lower end by said vertical arm above the aforesaid longitudinal carrier and extending toward the rear end of the machine in an upwardly inclined direction and suitably supported at the other end, a driven shaft suitably journaled and having the upper roll of said upper longitudinal belt fixedly mounted thereon, a sprocket wheel fixedly mounted on the latter driven shaft, a spur gear wheel fixedly mounted on the latter driven shaft and coacting with the aforesaid pinion, an elevating endless carrier belt extending from the lower rear end of the frame in an upwardly inclined direction, a driven shaft suitably journaled and having the roll at the lower end of said elevating carrier fixedly mounted thereon, a sprocket wheel fixedly mounted on the latter driven shaft, a loose sprocket wheel mounted on the driven shaft of said lower longitudinal carrier, a chain operatively connecting the main sprocket wheel, the sprocket wheel on the driven shaft of said upper longitudinal carrier, the sprocket wheel on the driven shaft of said elevating carrier and passing over the idle sprocket wheel, rolls supporting said carriers, and a receptacle at the front end of the machine adapted to receive the potatoes from said elevating carrier.

Signed at Ottawa this 30th day of June 1910.

THOMAS GEORGE HERBERT.

Witnesses:
RENÉ A. PIGEON,
M. MAHONEY.

Copies of this patent may be obtained for five cents each, by addressing the "Commissioner of Patents, Washington, D. C."